United States Patent [19]
Azuma

[11] 3,895,992
[45] July 22, 1975

[54] APPARATUS FOR MANUFACTURING FOAMED PLASTIC

[76] Inventor: Kimikazu Azuma, No. 3-18 Matsugaoka 3-chome Kugenuma, Fujisawa-shi, Kanagawa-ken, Japan

[22] Filed: Apr. 13, 1973

[21] Appl. No.: 350,766

Related U.S. Application Data

[62] Division of Ser. No. 129,455, March 30, 1971, Pat. No. 3,758,459.

[30] Foreign Application Priority Data
Apr. 2, 1970 Japan............................. 45-28086
Apr. 2, 1970 Japan............................. 45-28087

[52] U.S. Cl. ................. 156/500; 425/155; 425/214
[51] Int. Cl. ............................................ B29d 23/04
[58] Field of Search ............ 156/244, 500; 310/83; 425/3, 155, 214

[56] References Cited
UNITED STATES PATENTS

| | | | |
|---|---|---|---|
| 3,051,987 | 9/1962 | Mercer | 156/500 |
| 3,376,180 | 4/1968 | Larson et al. | 156/500 |
| 3,579,723 | 5/1971 | Brown | 425/214 |
| 3,579,733 | 5/1971 | West | 425/155 |

*Primary Examiner*—Caleb Weston
*Attorney, Agent, or Firm*—Woodhams, Blanchard and Flynn

[57] ABSTRACT

A tubular network structure in which the size, spacing and/or orientation of the strands is changed at regular intervals along the lengthwise direction thereof. The strands of the network structure are made of foamed plastic. The network structure can be made into a protective cover or sleeve for objects. The network structure is made by extruding a foamable plastic through an annular rotary head die comprising a pair of rotary members which are rotatable relative to each other in a direction transverse to the direction of extrusion. The relative rate of rotation of the rotary members is changed at regular intervals to change the size, spacing and/or orientation of the strands so that the pattern of the network structure changes at regular intervals along the length thereof.

2 Claims, 9 Drawing Figures

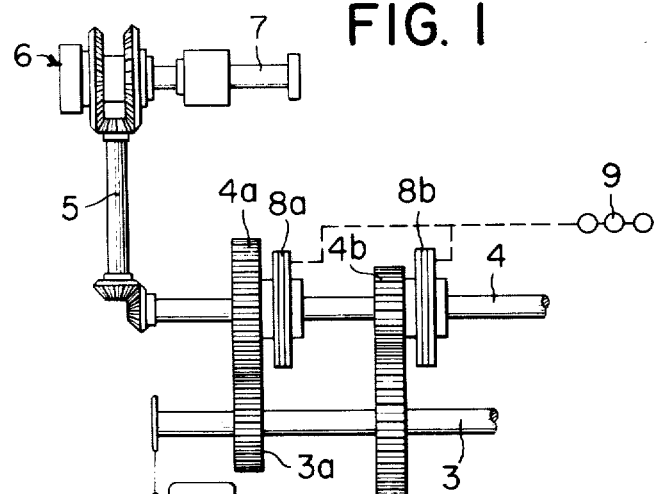
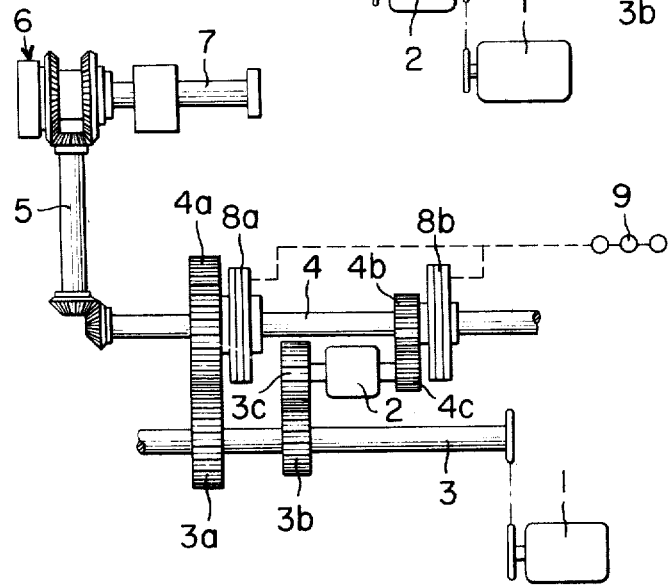
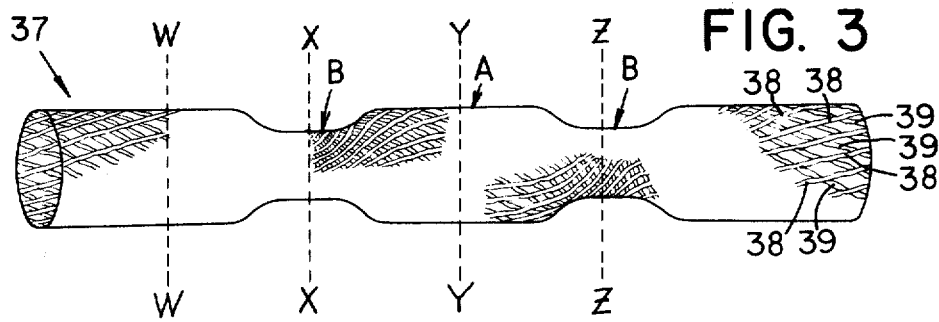

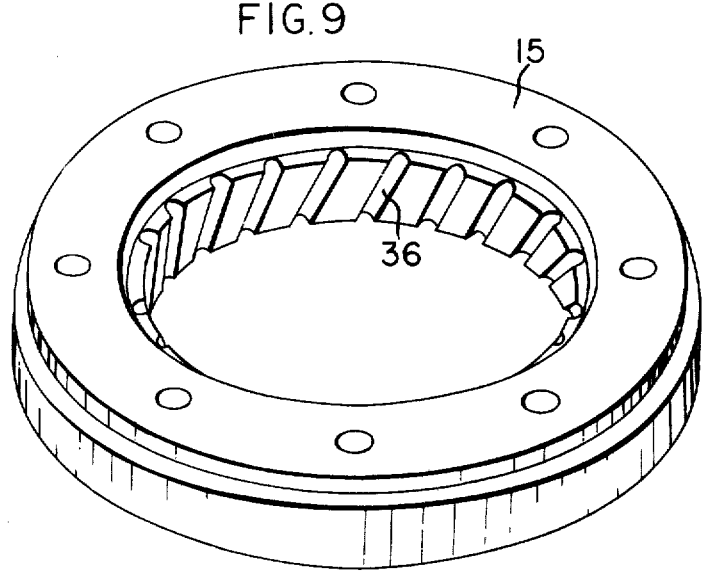
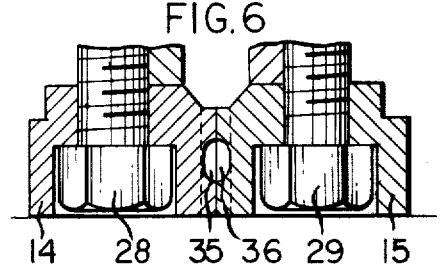
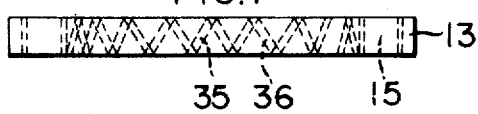
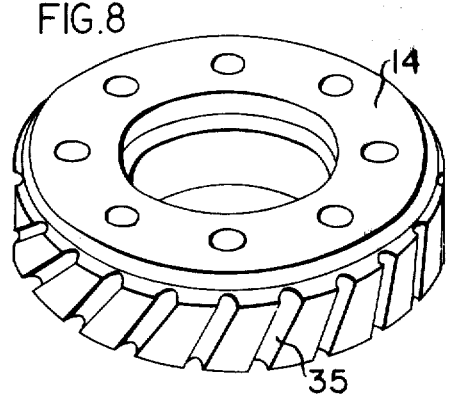

APPARATUS FOR MANUFACTURING FOAMED PLASTIC

This is a division of application Ser. No. 129,455, filed Mar. 30, 1971, now U.S. Pat. No. 3,758,459.

BACKGROUND OF THE INVENTION

1. Field of the Invention

The present invention relates to a method of manufacturing a foamed-plastic tubular network structure provided at regular, axially spaced intervals with portions having a different network pattern, as well as diameter. The invention also relates to an apparatus for performing said method. Moreover, the invention also relates to products of said method.

2. Description of the Prior Art

The method of manufacturing a continuous tubular net, in which the strands consist of a foamed plastic, by the process of extruding a foamable molten plastic material using an annular rotary head die comprising an inner rotary member and an outer rotary member which are capable of moving relative to each other in a direction transverse to the direction of extrusion and are provided with a plurality of slots along the confronting surfaces of them, is well known. This method is capable of producing a tubular net having a uniform shape and network pattern throughout its entire length. It is possible to modify the network pattern of said tubular net in its entirety by controlling the speed of the die as well as the amount of the plastic material extruded therefrom, but it is not possible to change the network pattern and diameter of the tubular net only in selected axially spaced zones. Consequently, the product resulting therefrom is only applicable to uses wherein it is acceptable to employ a tubular net having a uniform diameter.

SUMMARY OF THE INVENTION

The present invention relates to a method and an apparatus for manufacturing a foamed-plastic, tubular net which has a different network pattern and diameter in spaced zones along the lengthwise direction thereof. The resulting tubular net product is capable of resilient expansion and contraction in the radial direction so that it can be effectively utilized as a packing material for globular fruits and the like, and can be used as the buffer means for cylindrical articles.

The present invention is characterized by an apparatus for manufacturing a continuous foamed plastic tubular net by extruding a foamable molten plastic material through an annular rotary head die comprising a pair of rotary members capable of moving relative to each other in a direction transverse to the direction of extrusion, wherein the speed of the relative movement of said rotary members is changed at regular intervals between a low relative speed and a high relative speed to thereby form a tubular net product which has portions having a different network pattern and diameter at regular intervals along the lengthwise extent of said tubular net.

BRIEF DESCRIPTION OF THE DRAWINGS

FIG. 1 is a schematic representation of an apparatus constructed according to the present invention for producing a foamed plastic tubular net.

FIG. 2 is a schematic representation of a modified apparatus according to the present invention.

FIG. 3 is an oblique view of a foamed tubular net produced utilizing the apparatus of the present invention.

FIG. 6 is an enlarged view of a fragment of FIG. 4.

FIG. 7 is a schematic side view showing positions of the intersected slots of the annular die members.

FIG. 8 is a perspective view of the inner die member.

FIG. 9 is a perspective view of the outer die member.

DETAILED DESCRIPTION

Figure 4:
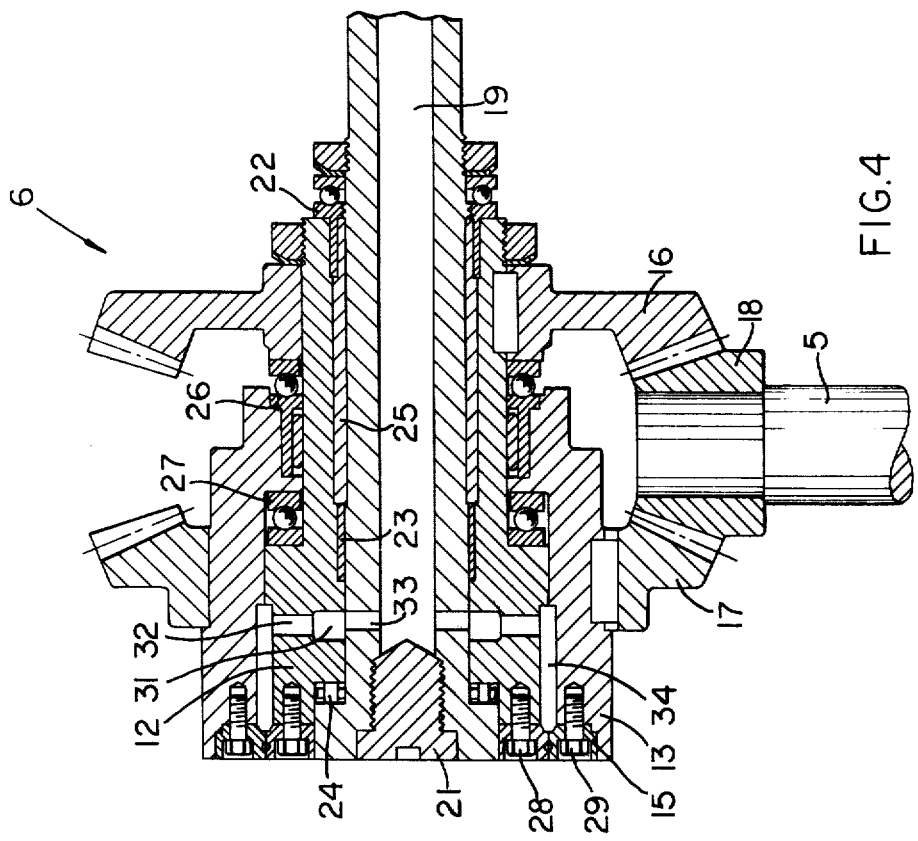
FIG. 4 is a vertical, central, sectional view of the die assembly used for extruding the foamed tubular net.

Referring to FIG. 1, 1 denotes a motor with a non-step change gear, 2 denotes a variable speed gear mechanism driven by said motor, 3 denotes a first driving shaft operated by said variable speed gear mechanism 2, 4 denotes a second driving shaft drivingly coupled with the first driving shaft 3, 5 denotes a driving shaft for driving a die assembly 6 coupled therewith, and 7 denotes an extruder for supplying molten foamable plastic to said die assembly 6. A gear $3a$ is mounted on the first driving shaft 3 for rotation therewith for the purpose of effecting low-speed driving of shaft 5 and a gear $3b$ also is mounted on shaft 3 for the purpose of effecting high-speed driving of shaft 5. A low-speed gear $4a$ and a high-speed gear $4b$ respectively engage the foregoing gears $3a$ and $3b$ and are rotatably mounted on the second driving shaft 4. The second driving shaft 4 is provided with electromagnetic clutches $8a$ and $8b$ capable of clutching the low-speed gear $4a$ and the high-speed gear $4b$, alternatively, to said shaft 4. These electromagnetic clutches $8a$ and $8b$ are operated in sequence and in timed relation by a conventional timer 9 which controls the energization sequence of the clutches.

In the foregoing apparatus rotation of the first driving shaft 3 by the variable speed gear mechanism 2 and the motor 1, causes the second driving shaft 4 to rotate. The electromagnetic clutches $8a$ and $8b$ alternately connect and disconnect the gears $4a$ and $4b$ to the shaft 4 by the function of the time switch of the timer 9 which causes the clutches $8a$ and $8b$ to be alternately and sequentially energized. By virtue of this operation, the second driving shaft 4 is continuously and alternately rotated at a low speed and at a high speed and this rotation is transmitted to the driving shaft 5. Said shaft 5 transmits the rotation to the rotary die assembly 6 which functions to control the extrusion of the foamable molten plastic material from the extruder 7 into the air.

During the time when the electromagnetic clutch $8a$ clutches the low-speed gear $4a$ to the shaft 4, the electromagnetic clutch $8b$ is disconnected to permit free rotation of the high-speed gear $4b$, whereby the foamed plastic tubular net of a distinctive pattern corresponding to the low-speed operation is extruded from the die assembly 6. During the time when the electromagnetic clutch $8b$ clutches the high-speed gear $4b$ to the shaft 4, by virtue of an operation reverse to the foregoing, the die assembly 6 operates at high-speed and the foamed plastic tubular net as formed has a smaller diameter and a different network pattern from that of the low speed operation. consequently, there is continuously obtained a product in the form of a tubular net 37 consisting of portions different in network pattern and diameter and formed alternately at regular intervals along the lengthwise direction. FIG. 3 shows an example of this product, wherein A represents the portion extruded at a lower die speed and B represents the portion extruded at a higher die speed.

It will be noted that the helical strands in the Section B of the tubular net product are of smaller cross-section, are more closely spaced and have a shorter pitch, i.e., their angle of slope with respect to the longitudinal axis of the net is less, as compared with the strands in Section A. As a consequence, Section B shrinks diametrically to a greater extent upon solidification of the foamed resin, whereby the diameter of Section B is smaller than the diameter of Section A.

FIG. 2 is a schematic representation of a modified apparatus according to the present invention, wherein the variable speed gear mechanism 2 is disposed between the high-speed driving gear 3b and the high-speed driving gear 4b to work through the medium of the idle gears 3c and 4c, thereby permitting only the high-speed to be varied.

Considering now the die assembly 6 illustrated in FIGS. 4–9, 11 denotes the die holder, 12 denotes the inner rotary member, 13 denotes the outer rotary member, 14 denotes the inner die member and 15 denotes the outer die member. Further, 16 denotes the bevel gear which is nonrotatably connected to the inner rotary member 12, 17 denotes the bevel gear which is nonrotatably connected to the outer rotary member 13, and 18 denotes the bevel pinion for driving said rotary members from the shaft 5.

The die holder 11 has an internal feed passage 19 into which the molten resin to be extruded is introduced from the extruder 7. The die holder 11 is fixed on the end of the extruder 7, which extruder is of conventional construction, such as disclosed in U.S. Pat. Nos. 2,669,751, 2,836,851, 3,160,688, 3,368,008 and 3,374,300. The feed passage 19 is closed by a plug 21 at the end of the die holder 11. The inner rotary member 12 encircles the die holder 11 with the bearings 22, 23 and 24 and the spacer 25 being disposed therebetween to ensure smooth rotation of said inner rotary member. The outer rotary member 13 encircles the inner rotary member 12 with the bearings 26 and 27 being disposed therebetween to ensure smooth rotation of the outer rotary member with respect to the inner rotary member. The inner die member 14 is mounted on the end of the inner rotary member 12 by means of bolts 28 and the outer die member 15 is mounted on the end of the outer rotary member 13 by means of bolts 29.

The interior of the inner rotary member 12 is provided with a distribution chamber 31 comprising an annular groove for feeding the molten resin and a plurality of distribution channels 32 which extend radially outwardly from said chamber 31 at equal angular spacings from each other. The distribution chamber 31 is connected with the feed passage 19 by a plurality of branch orifices 33 which extend through the side wall of the die holder 11. Along the mating contact surfaces of the inner rotary member 12 and the outer rotary member 13, there is provided an annular orifice 34 which is jointly formed by said two rotary members. The annular orifice 34 is connected to all of the distribution channels 32.

Figure 5:
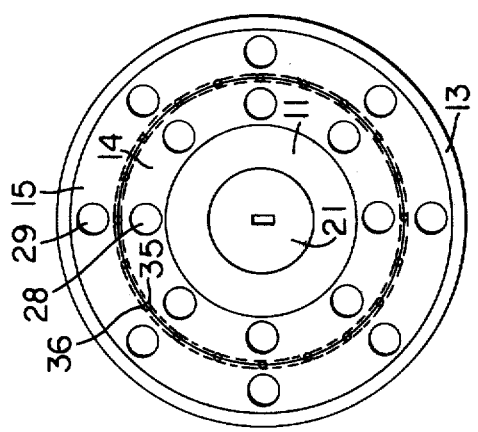
FIG. 5 is an end view of the die illustrated in FIG. 4.

As will be apparent from FIGS. 8 and 9, the inner die member 14 and the outer die member 15 are each ring-shaped and they are so designed that the inner die member 14 neatly fits within the central opening of the die member 15. The inner die member 14 is provided with a plurality of slanted slots 35 which are disposed at equal intervals along the outer circumferential surface thereof. The outer die member 15 is provided with a plurality of slanted slots 36 disposed at equal intervals along the inner circumferential surface thereof. The slots 36 are slanted in the direction opposite to the slanting of the slots 35. Moreover, the relative positions of these slots 35 and 36 are arranged so that each slot 35 continuously intersects at least one of the slots 36 within the contact zone between the inner die member 14 and the outer die member 15. FIGS. 5–7 show examples of the relative positions of the slots 35 and 36. That is, FIG. 6 shows the die arranged so that the slots 35 and 36 intersect at about the middle of the length of the contact zone of the die members 14 and 15, and FIG. 7 shows the dies arranged so that the slots 35 and 36 intersect at two points, such as at the inlet and outlet thereof.

The slots 35 and 36 are required to be provided in such an arrangement that the position where the slots 35 and 36 intersect will shift, by virtue of the relative rotation between the inner die member 14 and the outer die member 15 in the direction of flow of the extruded material from the die along the locus of the slot. This is because of the fact that, if the intersection position were to shift in a direction opposite to the direction of flow of the extruded material from the dies along the locus of the slot, the molten resin could not be extruded from the die. Thus, for the reasons stated above, in case the slots 35 and 36 are provided slanting in the directions shown in FIGS. 8 and 9, the direction of rotation of the inner die member 14 with respect to the outer die member 15 must be in the direction indicated with the arrow in FIG. 5. Accordingly, in case the directions of slant of the slots 35 and 36 are respectively opposite to those illustrated, the directions of relative rotation between the inner die member 14 and the outer die member 15 should be respectively opposite to the direction indicated by said arrows.

In operation, the molten resin is extruded from the extruder 7 and is forced into the feed conduit 19. The molten resin subsequently flows into the distribution chamber 31 by way of the branch orifices 33 and flows therefrom into the annular orifice 34 via the distribution channels 32. The molten resin is then fed into the interstices between the inner die member 14 and the outer die member 15, which are rotating relative to each other, so that the resin flows out of the die assembly so as to form a tubular net 37. Because the die members 14 and 15 are relatively rotating with respect to each other, the molten resin is caused to form reticular intersections at the points where the slots 35 and 36 cross with one another and the extruded product is fed out continuously as an integral tubular net.

The tubular net 37 as extruded from the die assembly 6 includes a first plurality of outer elongated strands 38 which are disposed in substantially parallel relationship and are wound in a helical pattern. The strands 38 are extruded through the slots 36 formed in the outer die member 15. The tubular net 37 also includes a further series of inner elongated strands 39 which are also substantially parallel to one another and extend in a substantial helical pattern which is wound in the opposite direction from the helical pattern of the strands 38. The strands 39 are extruded through the slots 35 formed in the inner die member 14 so that the strands 39 are disposed directly adjacent and within the outer strands 38.

Further, due to the intersection between the slots 35 and 36, the outer and inner strands 38 and 39, respectively, intersect one another with the strands being in contact and substantially integrally bonded together at said points of contact. The resulting foamed tubular mesh 37 thus comprises inner and outer tubular layers each of which includes a plurality of elongated helical strands, with the individual strands of the inner layer being wound in the opposite direction from the individual strands of the outer layer, and with the individual strands of the inner and outer layers being integrally connected at their points of intersection. As previously noted, in Section B the strands 38 and 39 are more closely spaced and have a shorter pitch, than in Section A.

According to the present apparatuses, by appropriately determining the rate of rotation of the motor as well as the variable speed gear mechanism and the combination of various gears and electromagnetic clutches, the r.p.m. of the die assembly can be changed at will, and the duration of the low-speed operation and high-speed operation can be controlled as desired by means of the time setting of the timer which controls the electromagnetic clutches, so that it is possible to continuously produce a foamed tubular net having desired network patterns and different diameters. Particularly in case of the apparatus shown in FIG. 2, since the variable speed gear mechanism is capable of controlling only the high speed driving, it is feasible to effect a delicate adjustment of the diameter as well as the network pattern of the tubular net extruded at the time of high-speed driving. Further, this speed variation is possible during the operation of the apparatus, so that the switchover of one type of product to another can be easily performed.

Inasmuch as the foamed plastic tubular net resulting from the present invention is capable of expansion and contraction in the crosswise direction, it can be cut into pieces or segments of an appropriate length and utilized as a protective sleeve or cover to cover glassware, ceramic ware and various precision apparatuses of tubular shape. When cup-shaped pieces are obtained by cutting said tubular net in the middle of the portion A with the large diameter and at the neighboring portion B with the small diameter or when double-cup shaped pieces are prepared by cutting the tubular net in the middle of the adjacent portions A of large diameter and turning one half of each piece inside out in the middle of the portion with the small diameter, they can be effectively utilized as shock-proof packing sleeves or covers for globular fruits such as apples, pears, peaches, etc.

Further, the present apparatuses (FIGS. 1 and 2) can also be employed in manufacturing non-foamable plastic tubular nets in the same way as above, not to mention foamed tubular nets consisting of such thermoplastics as polyethylene, polystyrene, polypropylene, etc., which are provided with portions having a different network and diameter and formed at regular intervals along the lengthwise direction of the tubular net.

The following is an example embodying the present invention, but the scope of the present invention is not limited thereto.

EXAMPLE

In the operation of an apparatus shown in FIG. 1, a 5 H.P. motor (31 – 125 r.p.m.) was employed as the motor with a non-step speed change gear, and the rate of the low speed and the high speed was lowered to 1:9 by means of the variable speed gear mechanism. By the use of a 44 tooth by 66 tooth gear ratio on the low-speed side and a 66 tooth by 44 tooth gear ratio on the high-speed side, the rotation of the die was adjusted to be 42 r.p.m. at the time of high speed, and the intervals of the change of speed of the die were adjusted to be 1.3 seconds for the low speed and 0.3 second for the high speed. Under the foregoing conditions, foamable molten polyethylene resin was extruded from the die at the rate of 12 l/minute, whereby there was obtained a continuous tubular net consisting of foamed polyethylene and provided with portions having a different diameter as well as network patterns at regular intervals. The wide diameter portion A of this tubular net resulting from the low-speed extrusion was 80 mm in diameter, 190 mm in length, and the number of meshes lengthwise was 6, while the narrow diameter portion B thereof resulting from the high-speed extrusion was 55 mm in diameter, 50 mm in length, and the number of meshes lengthwise was 4, each mesh being smaller in size than that of the portion A.

The embodiments of the invention in which an exclusive property or privilege is claimed are defined as follows:

1. An apparatus for use in manufacturing a foamed plastic tubular net, comprising a motor, a first shaft driven by and drivingly interconnected to said motor, a second shaft driven by and drivingly interconnected to said first shaft, first means drivingly connectible between said first and second shafts for permitting driving of said second shaft from said first shaft, said first means including a low speed driving gear provided on said first shaft and a low speed driven gear provided on said second shaft, said first means further including first electromagnetic clutch means associated with said low speed driven gear for selectively clutching same to said second shaft, second means drivingly connectible between said first and second shafts for permitting driving of said second shaft from said first shaft, said second means including a high-speed driving gear provided on said first shaft and a high-speed driven gear provided on said second shaft, said second means further including second electromagnetic clutch means associated with said high speed driven gear for selectively clutching same to said second shaft, timer means coupled to said first and second electromagnetic clutch means for causing said first and second clutch means to be alternately and sequentially energized for causing said second shaft to be alternately and sequentially rotated at high and low speeds for predetermined time periods, a variable speed gear mechanism drivingly connected in series between the high-speed driving gear and the high-speed driven gear, die means for extruding a tubular net, said die means being connected to and rotatably driven by said second shaft and being rotatable in a direction transverse to the direction of extrusion of the net, and extruder means connected with said die means for extruding said tubular net therefrom.

2. An apparatus for use in manufacturing a foamed plastic tubular net, comprising a motor, a first shaft driven by and drivingly interconnected to said motor, a second shaft driven by and drivingly interconnected to said first shaft, first means drivingly connectible between said first and second shafts for permitting driving of said second shaft from said first shaft, said first means including a low speed driving gear provided on said first shaft and a low speed driven gear provided on said second shaft, said first means further including first electromagnetic clutch means associated with said low speed driven gear for selectively clutching same to said second shaft, second means drivingly connectible between said first and second shafts for permitting driving of said second shaft from said first shaft, said second means including a high-speed driving gear provided on said first shaft and a high-speed driven gear provided on said second shaft, said second means further including second electromagnetic clutch means associated with said high speed driven gear for selectively clutching same to said second shaft, timer means coupled to said first and second electromagnetic clutch means for causing said first and second clutch means to be alternately and sequentially energized for causing said second shaft to be alternately and sequentially rotated at high and low speeds for predetermined time periods, a variable speed gear mechanism drivingly connected in series between said motor and said first shaft, die means for extruding a tubular net, said die means being connected to and rotatably driven by said second shaft and being rotatable in a direction transverse to the direction of extrusion of the net, and extruder means connected with said die means for extruding said tubular net therefrom.

* * * * *